United States Patent
Zhao et al.

(10) Patent No.: US 10,091,297 B1
(45) Date of Patent: Oct. 2, 2018

(54) DATA PROCESSING AND DATA MOVEMENT IN CLOUD COMPUTING ENVIRONMENT

(71) Applicants: EMC Corporation, Hopkinton, MA (US); EMC IP Holding Company LLC, Hopkinton, MA (US)

(72) Inventors: Junping Zhao, Beijing (CN); Ricky Sun, Beijing (CN); Yu Cao, Beijing (CN); Kenneth Durazzo, San Ramon, CA (US); Xiaoyan Guo, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 107 days.

(21) Appl. No.: 15/158,013

(22) Filed: May 18, 2016

(51) Int. Cl.
*G06F 15/16* (2006.01)
*H04L 29/08* (2006.01)
*G06F 17/30* (2006.01)

(52) U.S. Cl.
CPC ........ *H04L 67/1097* (2013.01); *G06F 17/303* (2013.01)

(58) Field of Classification Search
CPC ........... G06F 11/1453; G06F 17/30575; G06F 2009/4557; G06F 11/1435; G06F 11/1461; G06F 3/0641; G06F 17/30578; G06F 9/4856; G06F 11/1448; G06F 11/1458; G06F 9/5088; H04L 67/06; H04L 67/1095
See application file for complete search history.

(56) References Cited

U.S. PATENT DOCUMENTS

| 9,509,612 | B1* | 11/2016 | Armorer | H04L 47/12 |
| 2013/0212200 | A1* | 8/2013 | Dennis | H04L 51/22 |
| | | | | 709/206 |
| 2014/0196037 | A1* | 7/2014 | Gopalan | G06F 9/4856 |
| | | | | 718/1 |
| 2014/0344395 | A1* | 11/2014 | Alexander | H04L 67/34 |
| | | | | 709/217 |

(Continued)

OTHER PUBLICATIONS

EMC Corporation, "EMC VNX Replication Technologies: An Overview," White Paper, Nov. 2015, 34 pages.

(Continued)

*Primary Examiner* — Liang Che A Wang
*Assistant Examiner* — Ayele F Woldemariam
(74) *Attorney, Agent, or Firm* — Ryan, Mason & Lewis, LLP

(57) ABSTRACT

A plurality of data sets to be moved from a source site to a target site in a cloud computing platform is received at a plurality of a containerized data ingest components located at the source site. The received plurality of data sets are provided from the plurality of data ingest components to a staging cluster comprising a plurality of containerized broker components located at the source site, wherein the plurality of containerized broker components queue the plurality of data sets. The queued plurality of data sets are provided from the plurality of containerized broker components to a processing cluster comprising a plurality of containerized data processing components, wherein the plurality of containerized data processing components process the plurality of data sets. The plurality of data sets is transmitted from the plurality of containerized data processing components to the target site.

20 Claims, 8 Drawing Sheets

(56) References Cited

U.S. PATENT DOCUMENTS

2016/0216904 A1* 7/2016 Joshi ................ G06F 3/0619
2017/0024152 A1* 1/2017 Bhagi ................ G06F 3/0619

OTHER PUBLICATIONS

U.S. Appl. No. 15/271,357, filed in the name of J. Zhao et al. on Sep. 21, 2016 and entitled "Method and Device for Fingerprint Based Status Detection in a Distributed Processing System."

U.S. Appl. No. 15/382,887, filed in the name of J. Zhao et al. on Dec. 19, 2016 and entitled "Method and Apparatus for Distributed Data Processing."

* cited by examiner

DATA PROCESSING AND DATA MOVEMENT IN CLOUD COMPUTING ENVIRONMENT

FIELD

The field relates generally to data processing and data movement, and more particularly to data processing and data movement in cloud computing environments.

BACKGROUND

Computing environments, such as data centers, frequently employ cloud computing platforms, where "cloud" refers to a collective computing infrastructure that implements a cloud computing paradigm. For example, as per the National Institute of Standards and Technology, cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. Cloud-based data centers are deployed and managed by cloud service providers, who provide a computing environment for customers (tenants) to run their application programs (e.g. business applications or otherwise). Such cloud computing platforms may be implemented at least in part utilizing one or more virtual compute elements such as one or more virtual machines (VMs) or one or more containers. By way of example, one commonly used type of container is a Docker container.

In such a cloud computing platform, data may typically have to be moved across one or more networks. Reasons for such data movement include, but are not limited to, data migration into or out of the cloud environment, cross-site data protection, or re-scheduling of workflow instances.

Enterprises (e.g., companies, institutions, etc.) typically have their own "on-premises" computing platforms (as compared with an "off-premises" computing platform such as the above-described cloud computing platform or data center). Within the on-premises context, various data moving technologies have been developed and employed. These traditional enterprise-level data moving techniques are designed to be tightly coupled, efficient, and have rich features such as, e.g., data compression and data deduplication. Such enterprise-level techniques tend to have sufficient recovery time objective (RTO) and recovery point objective (RPO) metrics. However, enterprise-level data moving techniques may not always be adequate outside the on-premises context.

SUMMARY

Embodiments of the invention provide techniques for improved data processing and data movement in cloud computing environments.

For example, in one embodiment, a method for moving data from a source site to a target site in a cloud computing platform comprises the following steps. A plurality of data sets to be moved from the source site to the target site is received at a plurality of containerized data ingest components located at the source site. The received plurality of data sets are provided from the plurality of data ingest components to a staging cluster comprising a plurality of containerized broker components located at the source site, wherein the plurality of containerized broker components queue the plurality of data sets. The queued plurality of data sets are provided from the plurality of containerized broker components to a processing cluster comprising a plurality of containerized data processing components, wherein the plurality of containerized data processing components process the plurality of data sets. The plurality of data sets is transmitted from the plurality of containerized data processing components to the target site. For each data ingest component of the plurality of data ingest components, a respective pipeline is formed through the staging cluster and the processing cluster, and the staging cluster and the processing cluster are scalable to add or remove a pipeline depending on the number of data ingest components providing data sets thereto. The source site and the target site are implemented via one or more processing devices operatively coupled via a communication network.

Advantageously, illustrative techniques provide data processing and data movement for a cloud computing platform which account for the dynamic provisioning, scaling, and high availability features of a cloud computing platform.

These and other features and advantages of the invention will become more readily apparent from the accompanying drawings and the following detailed description.

BRIEF DESCRIPTION OF THE DRAWINGS

FIG. 2 illustrates a data processing and data movement architecture, according to an embodiment of the invention.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above, traditional enterprise-level data moving technologies include efficient designs and rich features such as compression, deduplication, etc., while maintaining sufficient RTO/RPO metrics. Examples of such enterprise-level technologies include, but are not limited to, built-in replication capabilities of certain storage arrays such as VNX® replicator from EMC Corporation (Hopkinton, Mass.), data splitter capabilities such as RecoverPoint® from EMC Corporation (Hopkinton, Mass.), or gateway capabilities such as Export from Amazon Web Service™ (AWS).

However, most of these technologies are designed in a tightly-coupled manner which significantly limits their scalability. Thus, in a computing environment with many computing nodes, while some of these enterprise-level data moving technologies may have virtual machine (VM) versions that enable improved deployment, such a deployment does not change the nature of their otherwise monolithic architecture. Accordingly, it is realized herein that these cumbersome, monolithic enterprise-level technologies do not fit well in a dynamic provisioning, scalable, and highly available cloud environment.

Figure 1:
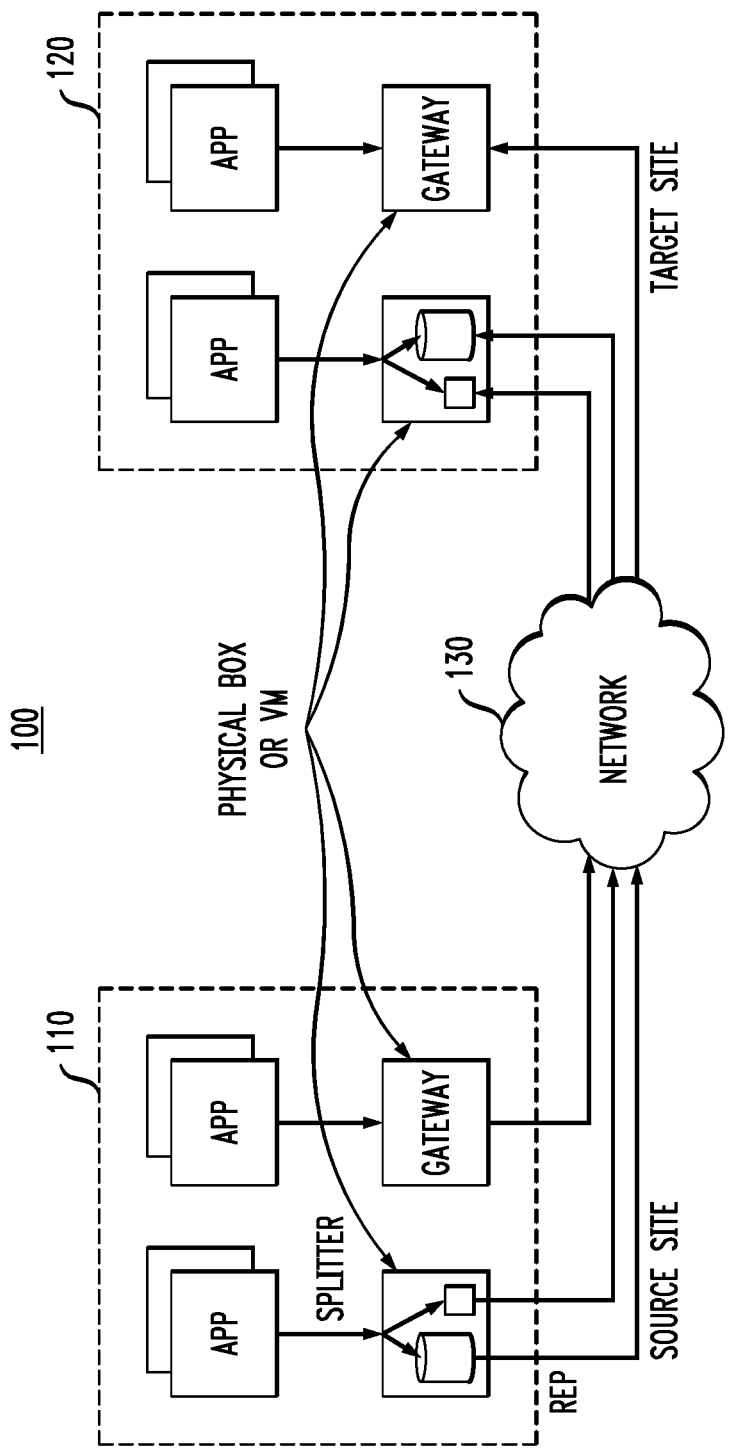
FIG. 1 illustrates typical data movement via array-based replicator, splitter or gateway functionalities.

FIG. 1 illustrates typical data movement via array-based replicator, splitter, and gateway functionalities. As mentioned above, the data movement approaches illustrated in FIG. 1 are traditional approaches used at the enterprise level. As generally shown in computing environment 100, application programs (applications or apps) execute at a source site 110, as well as at a target site 120. The two sites are coupled by a communication network 130. Assume data from the source site 110 has to be replicated at the target site 120. Thus, data must be moved across communication network 130. Replication, splitter, and gateway functionalities can be implemented at each site via VMs and/or physical devices (physical box). It is to be understood that one data site may or may not implement all three traditional data movement approaches, but they are shown together in FIG. 1 simply for convenience.

In general, data replication functionality, such as provided by VNX® replicator, typically includes asynchronous file system level replication technology that provides enterprises with the ability to handle disastrous events by transferring file system responsibilities (e.g., from source site 110) to a disaster recovery site (e.g., to target site 120). A data mover interconnect is a communication channel used to transfer data between the source and target sites. VNX® replicator works by sending periodic updates from one or more data mover components of the source file system (source site 110) to one or more data mover components of the target file system (target site 120).

Data splitter functionality, such as RecoverPoint®, provides synchronous and asynchronous replication over Internet Protocol (IP) or Fibre Channel networks enabling creation of point-in-time, Fibre Channel/iSCSI LUN copies at local or remote sites using one or more storage systems. The RecoverPoint® splitter function is used to "split" application writes and send a copy of the write to a RecoverPoint® Appliance (RPA). The splitter carries out this activity efficiently, with minimal perceivable impact on host performance, since all CPU-intensive processing necessary for replication is performed by the RPA. Thus, a copy of an application write at the source site 110 is sent to the target site 120 over the communication network 130.

Gateway functionality, such as AWS® Export, provides a gateway service that accelerates transferring large amounts of data using physical storage appliances and utilizes customer-provided portable devices to transfer smaller data sets. For example, large and/or small transfers may be made from the source site 110 to the target site 120 over the communication network 130 using AWS® Export.

These traditional enterprise-level approaches of array-based replication, application write splitting, or gateway transfers have limited scalability (e.g., usually one or two nodes), and are adequate for many traditional applications (since instance number is limited) or for dedicated/over-provisioned computing environments. However, a cloud computing platform typically deals with massive amounts of applications, data sets and cost models in a highly scalable environment, which is significantly different than the traditional enterprise-level environment.

One of the key factors that limits scalability with such traditional enterprise-level approaches is data processing tasks, such as data ingesting, deduplication, compression, encryption, indexing, etc., which cannot be easily partitioned and scheduled at multiple nodes. Instead, in such traditional approaches, software modules are tightly coupled within a single node with a heavy tuning effort involved in multi-core, inter-processes communication, etc.

Infrastructure resources and most applications/services in a cloud environment are dynamically provisioned and scheduled, typically in seconds rather than hours or days. However, many traditional enterprise-level data moving technologies are specially optimized for customized hardware, and cannot be easily decoupled to run in virtualized or even a containerized environment for rapid provisioning and minimized overhead. Additionally, in a cloud environment unlike a traditional enterprise-level environment, management and orchestration (M&O) is abstracted and integrated into a data center or cloud level control plane such as OpenStack, Mesos, etc.

Furthermore, many of the data processing tasks that need to be performed where important data is manipulated and/or moved across nodes/sites (e.g., data ingestion, data transfer, deduplication, etc.) are stateful in nature, as opposed to stateless whereby a "failure-restart" model can easily be applied. As is known, stateful means an application, task, and/or node keeps track of the state of interaction (usually by setting values in a storage field designated for that purpose), while stateless means there is no record of previous interactions. Thus, it is realized that consideration must be given to such stateful tasks which call for careful handling in terms of fault tolerance and efficiency, e.g., assuming a node fails, what is the impact to the overall data execution flow, and how does the system recover or rebuild in-progress tasks.

Many existing data moving technologies serve specific and limited data sources, e.g., array-based replication only works for the specific array product family, and other data moving technologies may only work for block/VM-based systems but not for file-based systems. Most of these existing technologies do not support cloud-native applications executing in a container (i.e., containerized applications). Considering the fact that there are many different kinds of applications and data sources in a data center, such as file, block, VM, container, database, etc., it is desired to have a consolidated solution that serves all of the data sources and moving requirements, thus reducing costs in terms of configuration, management and skill set re-learning.

To overcome the above-mentioned and other drawbacks, illustrative embodiments provide a micro-service oriented data processing and data moving framework for "as-a-service" level functionality. "As-a-service" refers to the cloud computing paradigm whereby one or more products and/or processes (i.e., services) are delivered over via the cloud (e.g., over the Internet) rather than provided locally or on-premises. "Micro-service" refers to a method of developing software applications as a suite of independently deployable, small, modular services in which each service runs a unique process and communicates through a well-defined, lightweight mechanism to serve a particular goal. In illustrative embodiments, such a framework is implemented in a cloud environment, such as one that executes one or more container clusters, which include features such as scalability, fault-tolerance, extensibility and fast deployment/scheduling.

Figure 2:
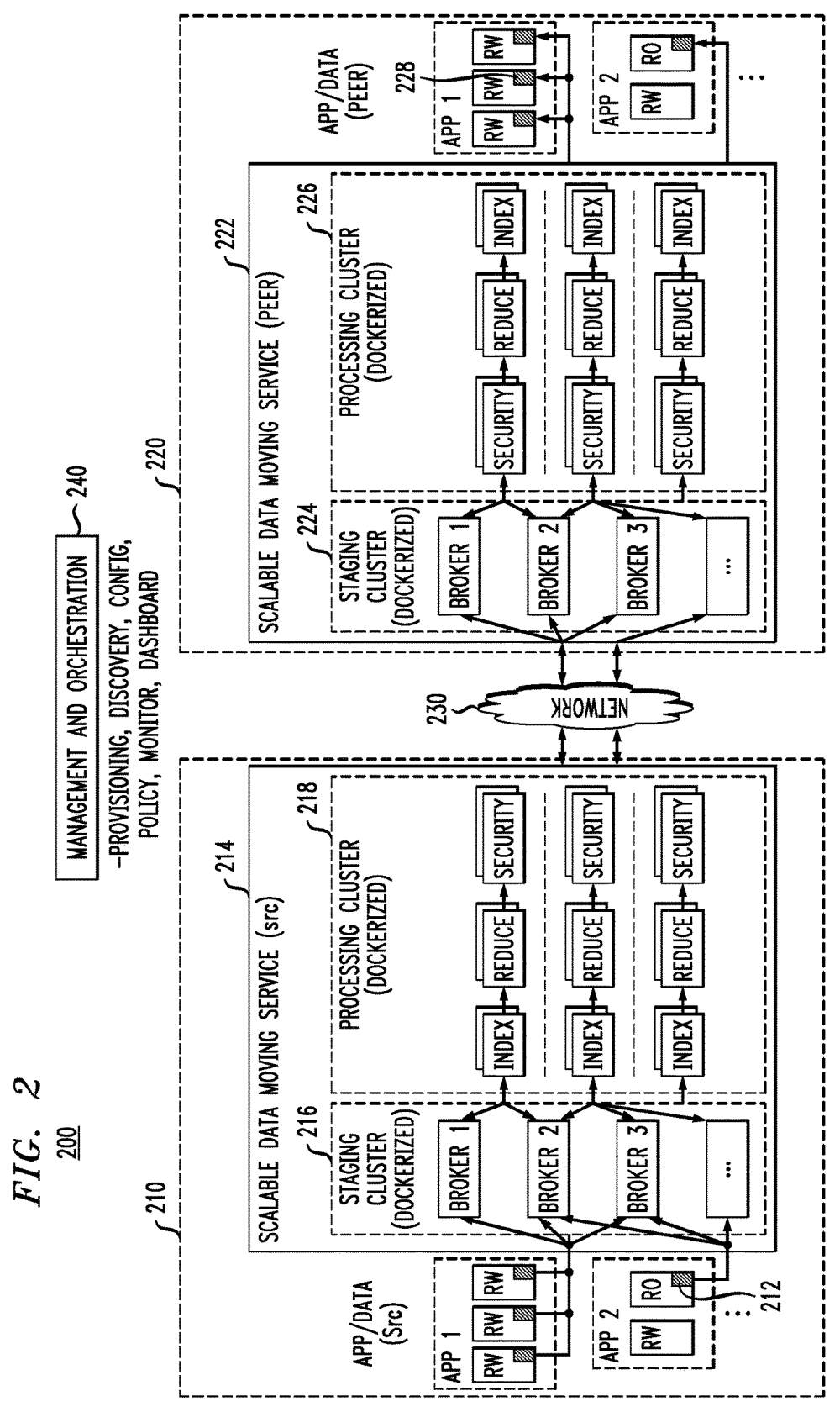

FIG. 2 illustrates a data processing and data movement architecture, according to an embodiment of the invention. As shown in illustrative computing environment 200, it is assumed that there is a source site 210 coupled to a target (peer) site 220 via communication network 230. In an illustrative embodiment, each site can be a separate cloud (or separate set of clouds) in an overall cloud computing platform. Alternatively, the sites could be part of one cloud. Each site comprises a data processing and data movement architecture that serves to overcome the above-mentioned and other drawbacks associated with traditional data moving technologies.

As shown at source site 210, one or more application instances executing on the site comprise one or more agent components (agents) 212. In this example, the agents 212 are associated with rewritable (RW) and/or read-only (RO) instances of the applications. That is, in illustrative embodiments, an application can have multiple instances with more than one active instance (e.g., App1 has three active-RW instances or nodes) or multiple instances with one active instance and one standby instance (e.g., App2 has two instances or nodes, one RW and one RO). Each instance may be running in a physical device, a VM or a Docker container. Thus, FIG. 2 shows two typical cases: (1) a scale-out type application (App1) such as Cassandra (Apache-based distributed database management system) where each instance is rewritable, so an agent 212 is configured at each instance; and (2) an active-standby mode application (App2) such as MySQL where the standby instance is a RO replica of the active RW instance (maybe with a lag), and for such case, to reduce overhead on the active node, the agent 212 is configured at the standby-RO node. As mentioned, each application instance may be executing in its own dedicated container. In the case of the use of Docker containers, this is referred to as being "dockerized," but is also more generally referred to as being "containerized."

Further, as shown at source site 210, a scalable data moving service 214 comprises a staging cluster 216 and a processing cluster 218. Each of the staging cluster 216 and processing cluster 218 is dockerized/containerized (e.g., one or more components therein are executing in one or more containers). The staging cluster 216 comprises a set of broker components (brokers) respectively coupled to the agents 212. In this illustrative embodiment, each agent 212 is coupled to its own dedicated broker (e.g., broker1, broker 2, broker3, . . . , etc.). The processing cluster 218 comprises a set of index components respectively coupled to the brokers, a set of reduce components respectively coupled to the index components, and a set of security components respectively coupled to the reduce components. Thus, for each agent 212, there is a processing pipeline that comprises a broker, an index component, a reduce (data reduction) component, and a security component.

As shown, each component in the processing cluster 218 can be configured to enable or disable a specific data moving task. For example, the data reduction component handles data deduplication and/or data compression to reduce the traffic over the network 230 or the storage footprint on the target site 220. The security component handles data encryption before transferring the data to the (public) network 230.

The index component provides an indexing function typically for document. For example, the index can provide high level statistics such as abstraction from file (to be moved) attributes, e.g., owner, modify time, data length; or the index can be a detailed index about the document content. Document indexing is input/output (IO) intensive. However, now the index component is already loaded into memory and can be fully re-used for index building.

As shown at target site 220, a similar scalable data moving service 222 is provided but wherein the processing pipelines are reversed as compared with data moving service 214 at the source site 210.

Further, as shown at target site 220, the scalable data moving service 222 comprises a staging cluster 224 and a processing cluster 226. Each of the staging cluster 224 and processing cluster 226 is dockerized/containerized. The staging cluster 224 comprises a set of broker components (brokers). The brokers are respectively coupled to a set of security components, which are respectively coupled to a set of reduce (data reduction) components, which are respectively coupled to a set of index components of the processing cluster 226. The index components are respectively coupled to one or more agent components (agents) 228. As at the source site 210, the agents 228 of the target site 220 are associated with RW and/or RO instances (nodes) of one or more applications (e.g., App1, App 2, etc.) executing in one or more containers. For example, at the target site 220, the applications are reassembled such as with multiple RO or RW instances. Thus agents 228 are configured the same as at the source site 210 to receive the incoming traffic.

As also shown in computing environment 200, a management and orchestration (M&O) controller 240 provides various functionalities for the source site 210, target site 220, and communication network 230. Examples of functionalities of controller 240 include, but are not limited to, provisioning, discovery, configuration, policy implementation, monitoring, and administrator or user interface (e.g., dashboard function).

Accordingly, illustrative embodiments provide data processing and data movement functionalities "as-a-service" through (micro-) services 214 and 222. It is to be understood that while environment 200 shows one source site 210 and one target site 220, there can be more source sites (data sources) and/or more target sites (peers) similarly configured in environment 200. The sites may be coupled using Transmission Control Protocol/Internet Protocol (TCP/IP) across a local and/or a public network. In an illustrative embodiment, with separation of the control plane and the data plane, a primary focus of the data processing and data movement architecture in FIG. 2 is the data plane wherein a scalable, reliable and extensible data channel is provided between a data source (e.g., source site 210) and one or more peers (e.g., target site 220).

As will be explained in further detail below, the three main components of the data processing and data movement architecture comprise: the agent components (plus any plugins) that provide flexibility and extensible data ingest; the staging cluster for data aggregation and reliable ("true-of-fact") functionality for subsequent processing; and the processing cluster for continuous CPU/memory intensive data transformations with high fault-tolerance.

Accordingly, as shown in FIG. 2, a general data flow through the architecture is as follows:

1) Data source (src): various sources types supported via plugins→data ingest agents (with replica affinity)→partition to staging cluster→processed by scalable processing cluster (pipeline model), then go to peer site across network; and 2) Peer site: similar flow but in reverse order: staging cluster→scalable processing cluster→agents to application(s).

The concept of scalability here means that the staging cluster and the processing cluster are scalable to add or remove a pipeline (a path through the staging cluster and processing cluster) depending on the number of data ingest components providing data sets thereto.

In an illustrative embodiment, the operation is a data push mode, but in an alternative embodiment, specific components can be configured to pull data. As mentioned above, in illustrative embodiments, main components including agents, brokers, tasks, etc., are running in containers. Advanced central management and orchestration are integrated with the architecture using various M&O tools (e.g., provided by M&O controller 240). The architecture can be deployed in a cloud computing platform with an Information Technology as-a-service (ITaaS) implementation or any software defined data center (SDDC).

Figure 3:
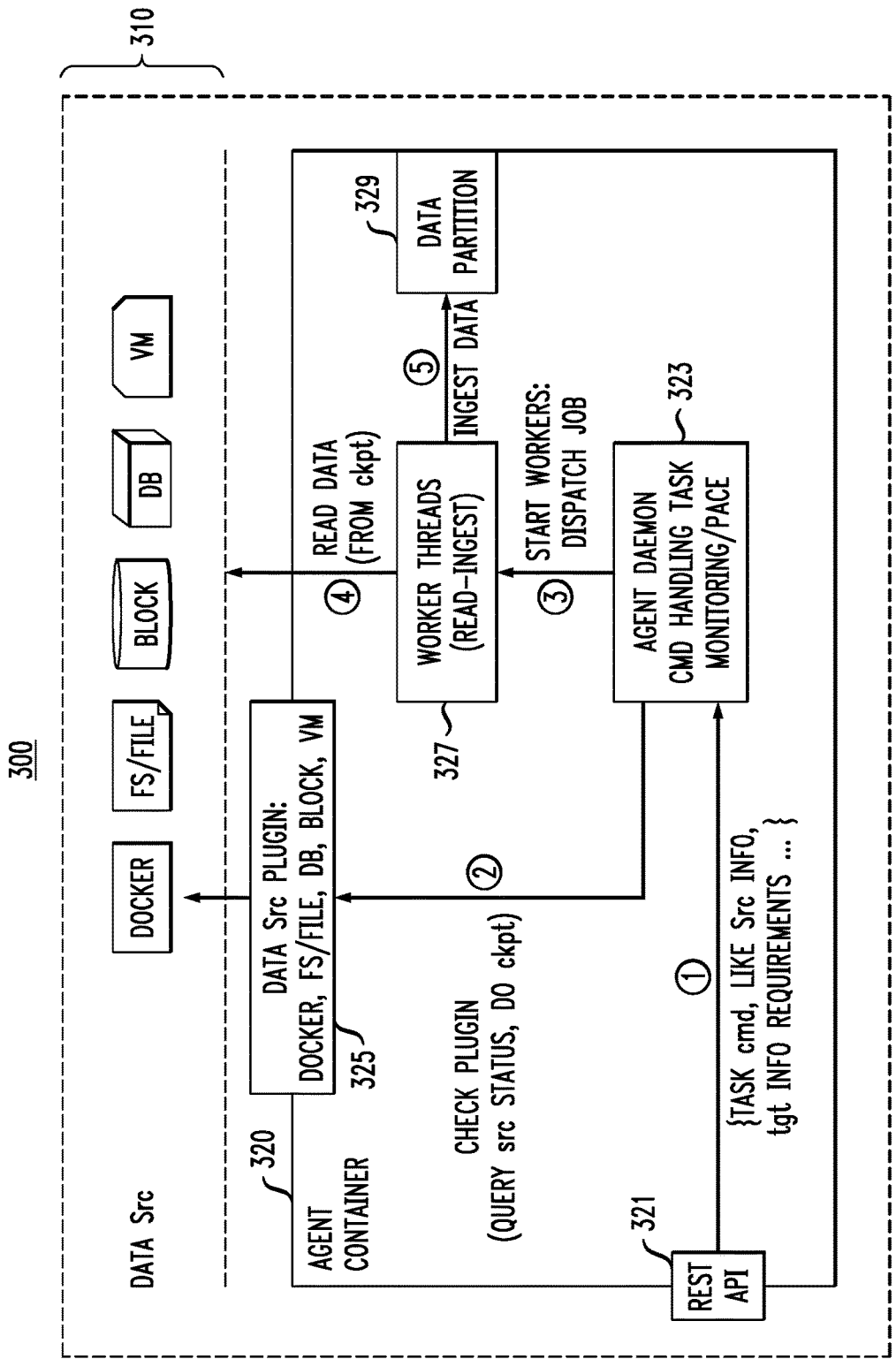
FIG. 3 illustrates an extensible plugin agent component at a data source, according to an embodiment of the invention.

FIG. 3 illustrates an extensible plugin agent component at a data source, according to an embodiment of the invention. As shown in architecture 300, a set of one or more data sources 310 (e.g., including a Docker container, a file from a file system (FS), a data block, a database (DB), a VM, etc.) are coupled to an agent container 320. Agent container 320 is an example of agent 212 or 228 shown in FIG. 2. Agent container 320 comprises a representational state transfer (REST) application programming interface (API) 321, an agent daemon 323, a data source plugin layer 325, one or more worker threads 327, and a data partition module 329.

More particularly, the agent container 320 operates closely with an application to ingest data (in the case of the agent being deployed at a source site) and apply data (in the case of the agent being deployed at a target/peer site). The agent container 320 executes within a container and exposes a REST control API 321 and TCP/IP data ports. The extensible plugin layer 325 is a software module that supports various types of data sources 310, such as, but not limited to, Docker, FS/file, block, DB, VM. The plugin layer 325 also supports various ingesting approaches via, e.g., checkpoint (ckpt), or tar/DBdump, or DB streaming, etc., and supports flexible control of data flow, e.g., frequency, ingest pace, partition parameters, etc. Thus, it is the various plugins function that manage data source operational details such as, but not limited to: application status check (e.g., running, inactive, paused, etc.); and consistent point (e.g., freeze, ckpt, resume) for data-moving purposes: such as CRIU for Docker, DevMapper-snap, KVM-snap, or specified tar files such as PostgreSQL PITR (Point-In-Time-Recovery, via pd_dump/archive_command), or even streaming mode such as PostgreSQL LD Streaming.

One example of operating steps performed by the agent container 320 is as follows (the numbers 1-5 below correspond to the numbering of steps in FIG. 3):

1) User submits, via REST API 321, a data moving task using pre-defined format specifying:
Source type, e.g., docker, PostgreSQL, FS, block, etc.;
Source instance or unique identifier (ID) such as Docker ID, file path, etc.;
Target information such as, e.g., IP:port;
Ingest approach, e.g., default via ckpt, or tar/dump, or streaming, etc.; and
Relevant parameters/service level agreement (SLA), e.g., ingesting every five minutes, perform end-end data cyclic redundancy check (CRC), encryption, auto-pace, etc.

2) Agent daemon 323 parses the task command and checks the plugin layer 325 (according to the source type in the task command). The plugin layer 325 checks the source instance status, and whether or not there is checkpoint support. If the checkpoint approach is specified, then the plugin layer 325 takes the ckpt, and returns ckpt to the agent daemon 323. For example, checkpoint/restore in userspace (CRIU) would take a ckpt for a running Docker instance, or PSQL pd_dump/archive to get the binary log tar files.

3) Daemon 323 launches one or more worker threads 327 and dispatches data reading tasks.

4) The one or more worker threads 327 read data segments in parallel and perform CRC, and optionally calculate a digest for deduplication.

5) Data segments are partitioned (data partition module 329) to the staging cluster, e.g., via {jobID, instanceID, Offset|Data Digest}.

The architecture advantageously provides affinity and flexible scheduling. More particularly, the agent wrapped as a container (320) can be flexibly controlled and scheduled, such as to reduce impact on a normal RW. The agent container 320 can be run on an RO node such as a MySQL RO replica. Other applications such as Cassandra support multiple RW nodes. If so, the agent can run on each node. With deep integration with a centralized service registry, the architecture can set an affinity policy to control the Docker-agent to handle cases such as application instance scale-out/in or online moving. As mentioned above, target (peer) agents are similar to source agents, but with reversed data direction.

Figure 4:
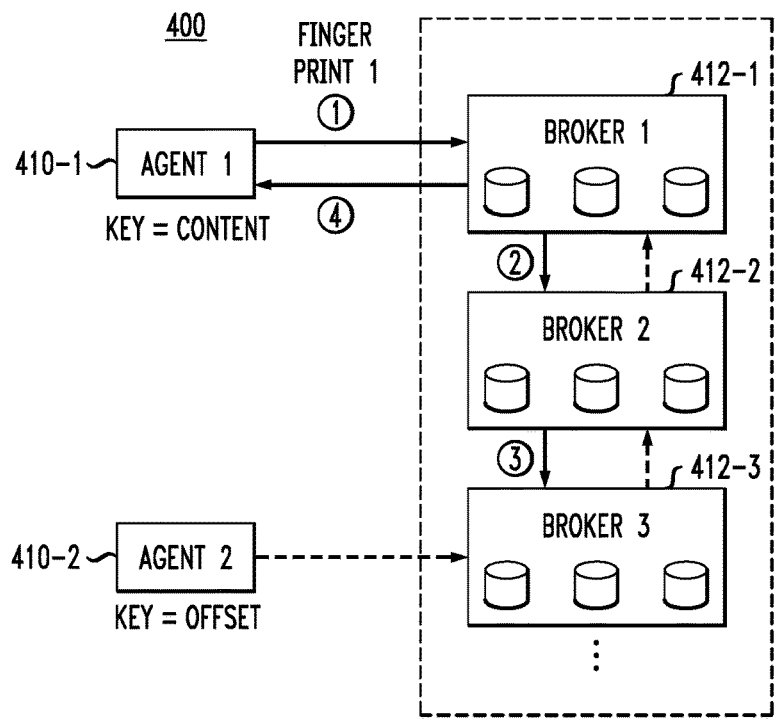
FIG. 4 illustrates a scalable data staging methodology, according to an embodiment of the invention.

FIG. 4 illustrates a scalable data staging methodology, according to an embodiment of the invention. More particularly, architecture 400 illustrates interaction between agent components 410-1 and 410-2 and broker components 412-1, 412-2, and 412-3 (part of a staging cluster such as 216 in FIG. 2).

More particularly, data is ingested by agents and pushed into a scalable, reliable data cluster for staging purposes before further transformation or manipulation (in the processing cluster). A staging cluster consists of a numbers of broker nodes, each broker takes over a piece of data in segments (configurable per task, such as about 32 KBytes~1 MBytes). For partitioned data when pushing into the staging cluster, a typical partition-key may be: (1) a coarse granularity such as jobID; or (2) a fine-grain granularity; for example, at each data segment level, two methods could be used: (i) segment offset in original file/block, etc., so data is evenly-balanced across brokers, and (ii) segment content indicated by SHA-1 or CityHash, etc. for a fingerprint (in such a case, similar data is stored together, thus facilitating subsequent data deduplication). In either case, the offset or hash are embedded as metadata. Each segment has its primary broker and optionally one or more (e.g., one to two) replicas. Data is acknowledged when a segment is safely saved on the primary broker and all replicas if so configured.

At each broker, data can be stored in append-style files, and can only be removed (by background threads) when: (1) data has been processed by the processing cluster, indicated by "commit offset;" and (2) there exists no other reference on that segment such as due to deduplication.

Thus, as shown in FIG. 4, illustrative ingesting steps are shown (the numbers 1-4 below correspond to the numbering of steps in FIG. 4):

1) Agent1 (410-1) partitions segments via content. For each given segment, the agent then calculates and embeds its fingerprint, then pushes both the data and the fingerprint into its primary broker (in this case broker1 or 412-1).

2) Primary broker 412-1 saves data locally (usually in a system cache and asynchronous flush), and forwards the data to a replica broker (in this case broker2 or 412-2) if configured in parallel.

3) Similarly to first replica, the data is saved locally and forwarded to the next replica (in this case broker3 or 412-3) if so configured.

4) When all replicas are done, an acknowledgment (ACK) is sent to the agent 410-1.

As illustrated, the partition key can be configured as one of two types: "content" (actually a hash value of content, as shown in agent1 410-1) or "offset." Agent2 410-2 here is the example of a partition by data block "offset." As shown, multiple agents or tasks can be running concurrently on the same broker (staging) cluster.

Figure 5:
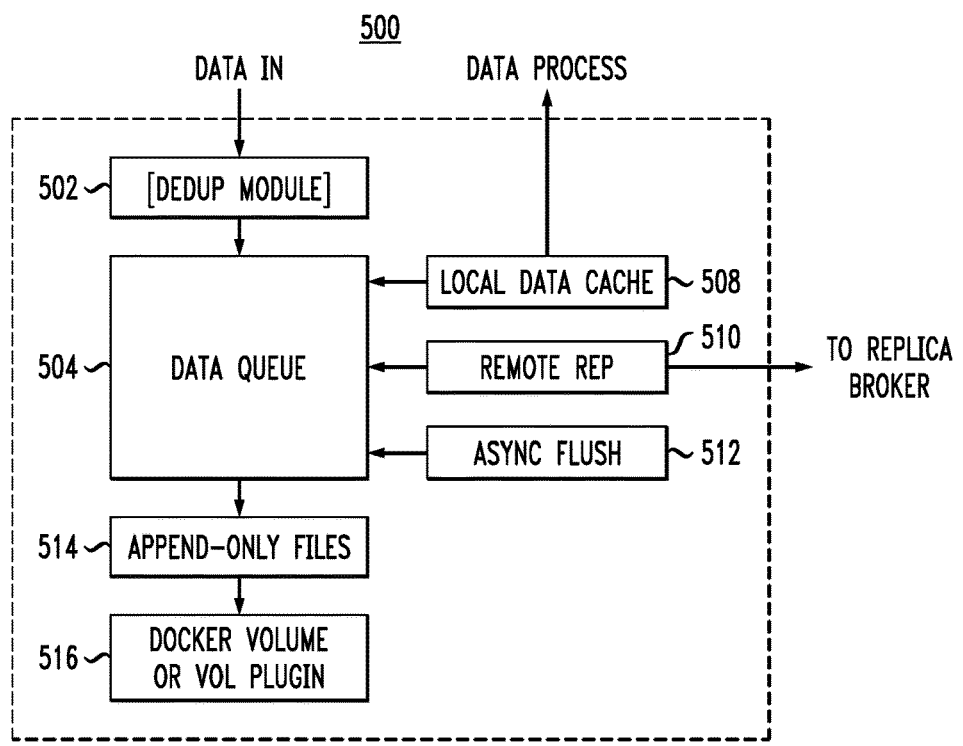
FIG. 5 illustrates a data staging broker component, according to an embodiment of the invention.

FIG. 5 illustrates a data staging broker component, according to an embodiment of the invention. As shown in architecture 500, a broker comprises a deduplication module 502, a data queue 504, a local data cache 508, a remote replication module 510, an asynchronous (async) flush component 512; append-only files 514, and Docker volume or volume plugin 516.

The staging cluster (multiple brokers) functionalities are shared for many applications/agents such as via TopicID (from unique taskID, for example). Basically, the staging cluster is IO/disk and memory intensive, since it is running as a Docker container, whereby disk storage can use either a local Docker volume or shared storage via Docker volplugin (516). Thus, data (514) is persistent and highly reliable with one or more replicas.

Deduplication (502) is optional for two possible purposes: one is to reduce any duplicate data storage footprint in the staging cluster (thus, reducing cost) and enable a large efficient cache (508) for higher performance; the other is to reduce data traffic over the communication network. The fingerprint can be calculated at the agent side during partition, thus duplication data is naturally ingested into the same broker. Further, a detailed hash comparison is performed since one broker accommodates many hash spaces (hash space is much greater than the number of brokers in the staging cluster), and a comparison of data depending on segment size versus hash collision probability may be performed. If data duplication is found, the broker increases its reference and keeps one unique data copy.

To reduce the memory footprint, local cache (508), remote replication (510), or asynchronous (async) flush (512), all point to single memory instance (in data queue 504) with reference and each maintains their offset.

The purpose of the above example is to reduce the memory copy between different sub-components. Another example will be given to show the difference. With incoming new data blocks, one can make a memory copy and send the copy to a remote replication module (510). Here the data content is maintained in a single queue (504). The remote replication module (510) maintains its pointer or actually offset with respect to its replication progress. If a copy is really needed, it may execute direct memory access (DMA) between the network card and data queue (504) to the network card. Local cache (508) maintains some index (e.g., hash) that points to the data content in the queue (504). Async flush module (512) also maintains its flush progress (offset) rather than making another copy.

Figure 6:
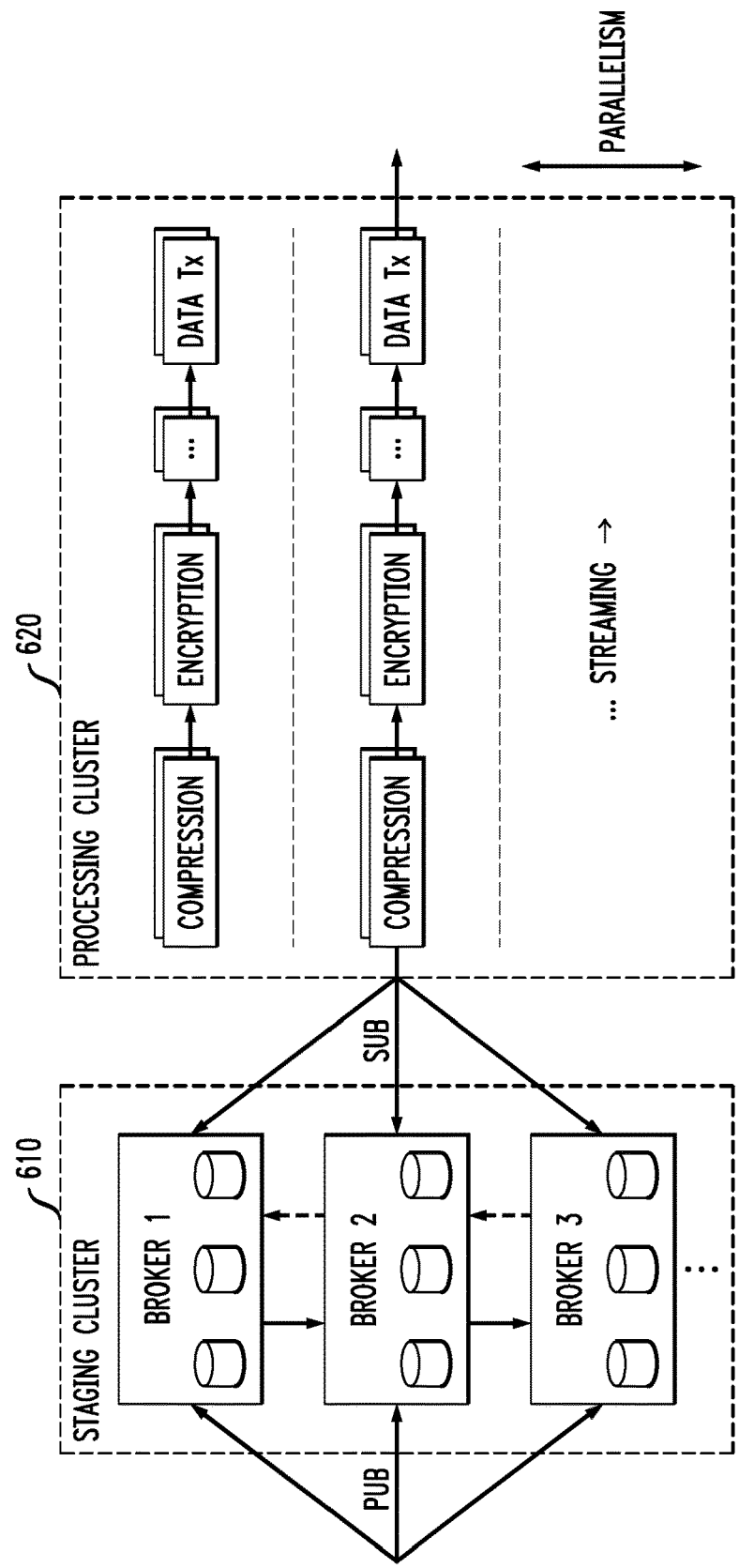
FIG. 6 illustrates a scalable processing cluster, according to an embodiment of the invention.

FIG. 6 illustrates a scalable processing cluster, according to an embodiment of the invention. As shown in architecture 600, a staging cluster 610 is coupled to a processing cluster 620.

Staging cluster 610, as described above, acts as a reliable ("true-of-fact") data source, and processing cluster 620 then manipulates or transforms those data sets using various operations such as, but not limited to, compression, encryption, data transforming, data indexing and/or data analytics. In an illustrative embodiment, the architecture adopts a streaming/processing model with a publish-subscribe model, i.e., agents publish data (or change) into staging cluster (with unique topic), and the processing cluster continuously loads data and processes data.

The architecture also employs an appending log style. The processing tasks illustrated in processing cluster 620 (e.g., compression, encryption, etc.) usually are CPU/memory intensive, though some of them may generate or persist data. In general, we consider all the data transforming operations as "logs," none of them alone or combined can change the "true-of-fact" nature of the data, i.e., a data set in the staging cluster stands for "what happened" and is thus immutable. This model greatly simplifies fault-tolerance and exception handling as will be further explained below.

Figure 7:
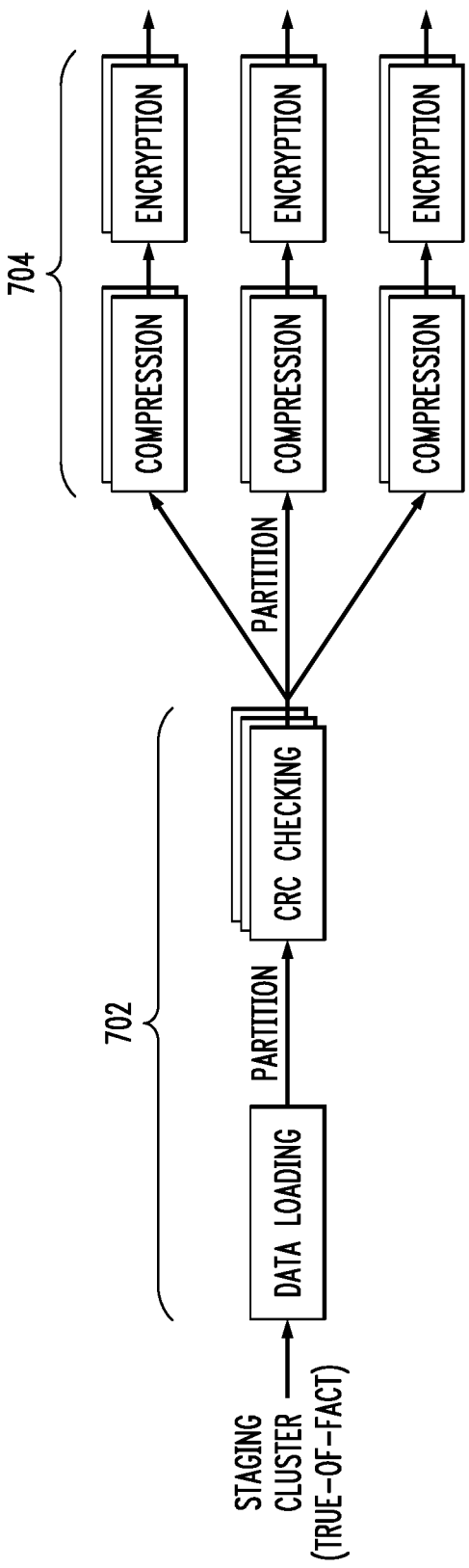
FIG. 7 illustrates a processing task as a directed acyclic graph, according to an embodiment of the invention.

FIG. 7 illustrates a processing task as a directed acyclic graph (DAG), according to an embodiment of the invention. As shown in FIG. 7, upstream tasks 702 (e.g., data loading and CRC checking) and downstream tasks 704 (e.g., compression and encryption) are organized in nodes as DAG 700. In illustrative embodiments, the DAG may take the form of the Big Data processing framework of Apache Spark or Apache Storm. In such an Apache Storm-like framework, data is partitioned into pieces and distributed to many nodes (actually many threads in containers). Unlike Apache Spark, there is no shuffle (usually for orderBy/GroupBy/ReduceBy purposes) needed in the Storm-like framework for such data moving scenarios. The last or leaf task (in this case, encryption) in the topology of DAG 700 usually sends the data to the peer site over the communication network. Note that a task can be enabled or disabled per a given configuration, thus there might be different DAG topologies running in the processing cluster.

Figure 8:
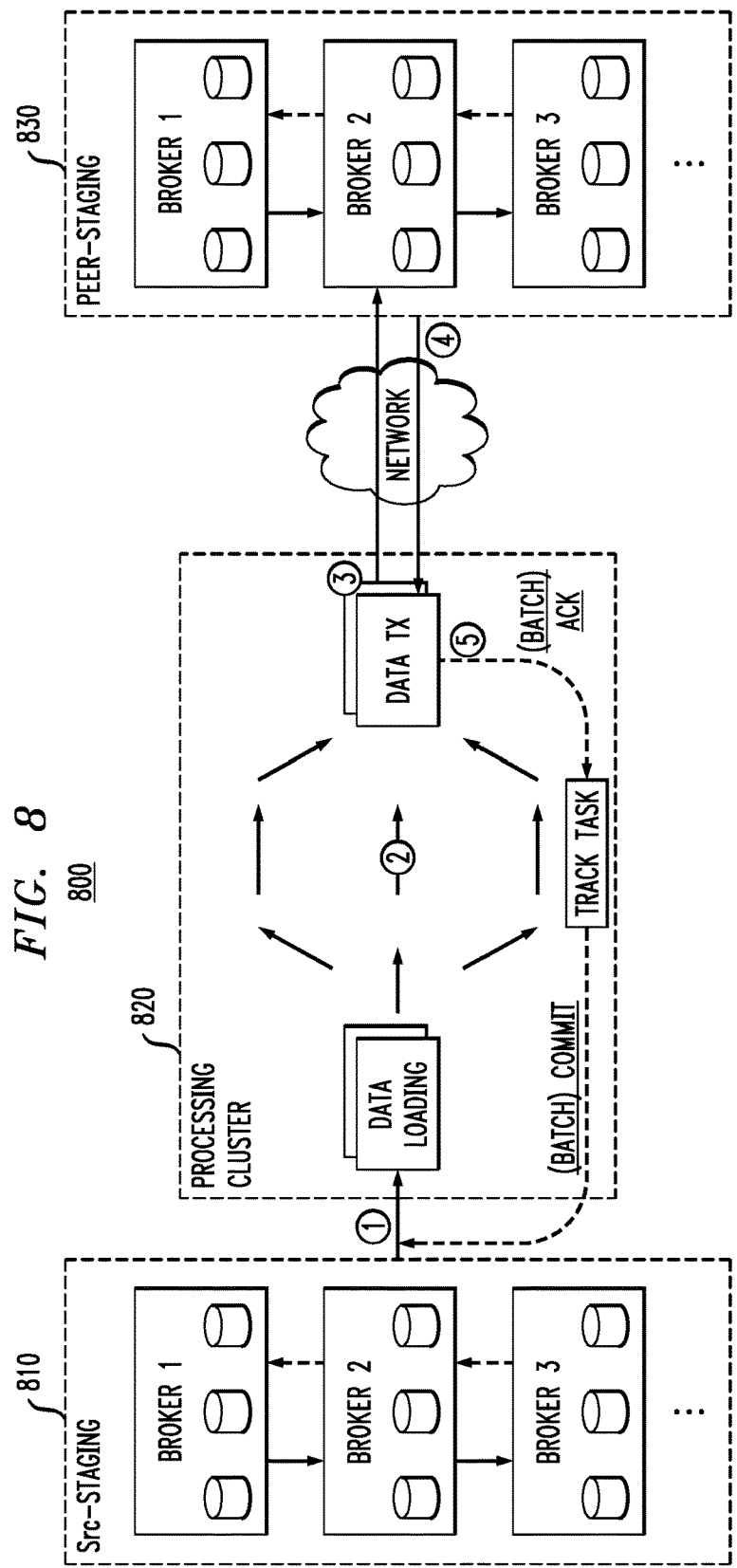
FIG. 8 illustrates a phase confirmation methodology, according to an embodiment of the invention.

FIG. 8 illustrates a phase confirmation methodology, according to an embodiment of the invention. As shown in architecture 800, an acknowledge plus commit ("Ack+Commit") two-phase confirmation mechanism is provided. FIG. 8 shows normal or successful processing steps. First, in step 1, there is a centralized task to track each retrieved source data's processing status (from the staging cluster). Only the last task in the DAG has the responsibility of sending an acknowledgement to the tracking task, and the source data is not marked as "completed" until all derived data pieces complete processing and reach the last task. Then, the tracking task commits the status to the staging cluster, which indicates the source data could be removed (by background thread if no deduplication reference).

In short, "Ack" is for the completion of the processing cluster internal status (bind with specific DAG and logic). "Commit" maps to an external signal and indicates that the source data can be safely removed. Both "Ack" and "Commit" can be performed in a batched manner.

Fault-tolerance and idempotent: it is important to provide high reliability and fault-tolerance. As illustrative embodiments implement a "log-style" processing principle and pub-sub model, simplified and scaled fault-tolerance can be provided as a failure detection→redo paradigm.

Failure detection: given a time-out setting (e.g., 30 seconds), any exception either task failure, node crash, network unavailable, etc., is marked as a "failure" in the tracking task, and stops the processing task at the second phase "commit." Therefore, source data at the staging cluster remains there, and nothing is lost. Note that a specific task failure would cause auto-restart of that thread by the agent daemon.

Redo: if enabled, the tracking task instructs and re-loads the data from the staging cluster and redoes the DAG until it reaches the leaf task. Importantly, in a data moving scenario, it follows an idempotent principle in that multiple redo operations do not impact the final result.

Thus, as shown in FIG. 8, illustrative ingesting steps are shown (the numbers 1-5 below correspond to the numbering of steps in FIG. 8):

1) Data is loaded from the source site staging broker cluster 810 into the processing cluster 820 (such loading is tracked by TaskID then Offset, the offset denotes the data's current processing progress).

2) Execute the data deduplication, compression, and encryption per configuration.

3) The dataset (already processed) is about to transfer to the peer site's staging broker cluster 830.

4) Peer site staging broker cluster 830 safely stores the dataset (such as with 3-replica), then sends Ack message to the data transmission (Tx) module (such as via TCP/Socket ACK). This is phase 1 commit.

5) Data Tx module further commits (phase 2 commit) current processing offset to the source site staging broker cluster 810, which means those pieces of the dataset can be safely removed or reclaimed by the source staging brokers, since they have been already safely moved to peer. If some error occurs before phase 2 commit, data content remains in the source site staging broker cluster 810 and can then re-do the DAG.

It is to be appreciated that the target or peer site has similar components, i.e., staging cluster, processing cluster, and agents, but data flows in reverse order as compared with the source site. The staging cluster at the peer site acts as another reliability ("true-of-fact") component, thus any exceptions during, e.g., decompression would not commit, and tasks can "redo" from the closet staging cluster (rather than retrieving data across the remote network). It is also to be appreciated that one site can play both the source role and the target role with a single cluster that shares the functionalities.

Accordingly, illustrative embodiments as described herein provide many advantages. Better scalability is realized due to the following: (1) a pub-sub processing model is introduced into the data moving/replication scenarios, and major components in the framework are loosely-coupled, such that each component is able to provide service with independent scale-out capability; (2) data sets are partitioned (either offset or content) at the beginning, and thus loads are shared by many nodes; (3) separation of stateful tasks (data staging) versus stateless tasks (in-memory processing); and (4) separation of IO/disk intensive tasks (data staging) versus CPU/memory intensive tasks (e.g., compression, encryption, indexing/analytics).

Furthermore, since the staging cluster acts as "true-of-fact," data would not be removed until explicitly committed via two-phase acknowledgement (which maps processing tasks complete state to signal data removal). With this feature, two major components are decoupled and fault handling is simplified. Though application level consistency is further validated, considering its data moving use scenario, for a given bunch of data segments, we can simply follow idempotent redo approach and the data moving result would not change.

To support multiple data sources, even different kinds of data moving purposes (one-off migration, tiering, backup, etc.), illustrative embodiments provide a plugin mechanism so that application details such as status, consistent ckpt, pause/resume, are offloaded, thus making the other parts of the framework generic enough for converged and unified data processing and moving.

As mentioned above, in illustrative embodiments, all components are dockerized/containerized. Since we separate stateless tasks and stateful tasks, CPU/memory intensive tasks and disk intensive tasks, it is easier to provision resources. With dockerization/containerization, benefits such as lighter package, fast running, easy deployment and management by popular tools such as OpenStack Magnum or Docker SWARM, K8S, Mesos, etc., are realized.

Figure 9:
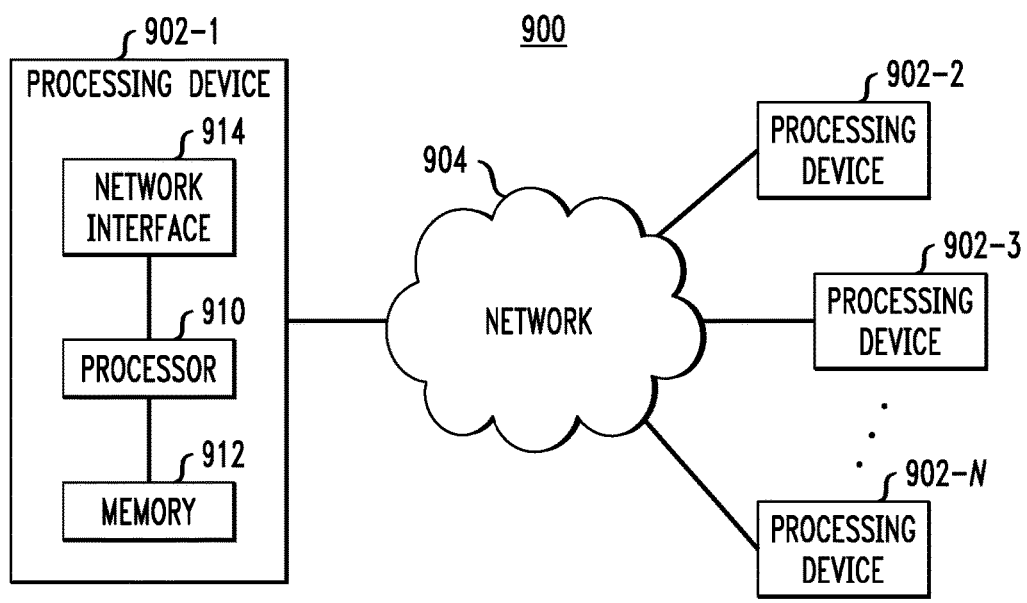
FIG. 9 illustrates a processing platform used to implement a data processing and data movement architecture, according to an embodiment of the invention.

FIG. 9 illustrates a processing platform used to implement a data processing and data movement architecture, according to an embodiment of the invention.

As an example of a processing platform on which a computing environment such as a cloud computing platform with data processing and data movement functionalities (e.g., FIGS. 2-8) can be implemented is processing platform 900 shown in FIG. 9. It is to be appreciated that processing platform 900 may implement the functionalities described herein. For example, the various architectures and methodologies of FIGS. 2-8 can be implemented in processing platform 900.

The processing platform 900 in this embodiment comprises a plurality of processing devices, denoted 902-1, 902-2, 902-3, . . . 902-N, which communicate with one another over a network 904. It is to be appreciated that the methodologies described herein may be executed in one such processing device 902, or executed in a distributed manner across two or more such processing devices 902. It is to be further appreciated that a server, a client device, a computing device or any other processing platform element may be viewed as an example of what is more generally referred to herein as a "processing device." As illustrated in FIG. 9, such a device generally comprises at least one processor and an associated memory, and implements one or more functional modules for instantiating and/or controlling features of systems and methodologies described herein. Multiple elements or modules may be implemented by a single processing device in a given embodiment.

The processing device 902-1 in the processing platform 900 comprises a processor 910 coupled to a memory 912. The processor 910 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 910. Memory 912 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 912 may comprise electronic memory such as random access memory (RAM), read-only memory (ROM) or other types of memory, in any combination. The one or more software programs when executed by a processing device such as the processing device 902-1 causes the device to perform functions associated with one or more of the components/steps of system/methodologies in FIGS. 2-8. One skilled in the art would be readily able to implement such software given the teachings provided herein. Other examples of processor-readable storage media embodying embodiments of the invention may include, for example, optical or magnetic disks.

Processing device 902-1 also includes network interface circuitry 914, which is used to interface the device with the network 904 and other system components. Such circuitry may comprise conventional transceivers of a type well known in the art.

The other processing devices 902 (902-2, 902-3, . . . 902-N) of the processing platform 900 are assumed to be configured in a manner similar to that shown for computing device 902-1 in the figure.

The processing platform 900 shown in FIG. 9 may comprise additional known components such as batch processing systems, parallel processing systems, physical machines, virtual machines, virtual switches, storage volumes, etc. Again, the particular processing platform shown in this figure is presented by way of example only, and the system shown as 900 in FIG. 9 may include additional or alternative processing platforms, as well as numerous distinct processing platforms in any combination.

Also, numerous other arrangements of servers, clients, computers, storage devices or other components are possible in processing platform 900. Such components can communicate with other elements of the processing platform 900 over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for moving data from a source site to a target site in a cloud computing platform, comprising:
  receiving a plurality of data sets to be moved from the source site to the target site at a plurality of containerized data ingest components located at the source site;
  providing the received plurality of data sets from the plurality of data ingest components to a staging cluster comprising a plurality of containerized broker components located at the source site, wherein the plurality of containerized broker components queue the plurality of data sets, wherein the staging cluster replicates one or more partitions of the received data set between broker components, and wherein each broker component performs a data deduplication operation;
  providing the queued plurality of data sets from the plurality of containerized broker components to a processing cluster comprising a plurality of containerized data processing components, wherein the plurality of containerized data processing components process the plurality of data sets, wherein the processing stage performs one or more of data encryption, data reduction, and data indexing prior to a data set being transmitted to the target site;
  transmitting the plurality of data sets from the plurality of containerized data processing components to the target site;
  wherein, for each data ingest component of the plurality of data ingest components, a respective pipeline is formed through the staging cluster and the processing cluster, and wherein the staging cluster and the processing cluster are scalable such that the method further comprises:
    adding an additional pipeline comprising a given containerized broker component in the staging cluster and a given containerized data processing component in the processing cluster when a data ingest component is added;
    removing an existing pipeline comprising a given containerized broker component in the staging cluster and a given containerized data processing component in the processing cluster when an existing data ingest component is removed;
  receiving the transmitted plurality of data sets at a staging cluster comprising a plurality of containerized broker components located at the target site, wherein the plurality of containerized broker components queue the plurality of data sets;
  providing the queued plurality of data sets from the plurality of containerized broker components to a processing cluster comprising a plurality of containerized data processing components; and
  providing the plurality of processed data sets from the plurality of containerized data processing components to a plurality of data application components;
  wherein, for each data set received, a respective pipeline is formed through the staging cluster and the processing cluster, and wherein the staging cluster and the processing cluster are scalable to add or remove a pipeline depending on the number of data sets received;
  wherein the source site and the target site are implemented via one or more processing devices operatively coupled via a communication network.

2. The method of claim 1, wherein each data ingest component receives a data moving task associated with a received data set.

3. The method of claim 2, wherein each data ingest component processes the received data set in accordance with one or more parameters of the data moving task.

4. The method of claim 3, wherein the one or more parameters of the data moving task specify one or more of: a source type of the received data set; an identifier of the source of the received data set, target site information; and one or more processes to be performed on the received data set.

5. The method of claim 3, wherein each data ingest component launches one or more worker threads to read the received data set.

6. The method of claim 5, wherein each data ingest component partitions the received data set and sends the partitioned data set to the staging cluster.

7. The method of claim 6, wherein each data ingest component partitions the received data set in accordance with one of a content key and an offset key.

8. The method of claim 1, wherein each data ingest component is configured to execute in accordance with an instance of an application program.

9. The method of claim 8, wherein the instance of the application program is one of a rewritable application instance and a read-only application instance.

10. The method of claim 1, wherein each broker component performs an asynchronous data flush operation.

11. The method of claim 1, wherein the staging cluster and the processing cluster form a directed acyclic graph structure.

12. The method of claim 1, wherein the staging cluster and the processing cluster perform a two-phase acknowledgment procedure.

13. The method of claim 12, wherein the two-phase acknowledgment procedure comprises an acknowledge step and a commit step to confirm that a data set has been fully processed by the processing cluster.

14. The method of claim 13, wherein the staging cluster removes the data set once receiving confirmation that the data set has been fully processed.

15. The method of claim 1, wherein each of the data application components is executed in its own container.

16. A system for moving data from a source site to a target site in a cloud computing platform, the system comprising:
at least one processor, coupled to a memory, and configured to:
receive a plurality of data sets to be moved from the source site to the target site at a plurality of containerized data ingest components located at the source site;
provide the received plurality of data sets from the plurality of data ingest components to a staging cluster comprising a plurality of containerized broker components located at the source site, wherein the plurality of containerized broker components queue the plurality of data sets, wherein the staging cluster replicates one or more partitions of the received data set between broker components, and wherein each broker component performs a data deduplication operation;
provide the queued plurality of data sets from the plurality of containerized broker components to a processing cluster comprising a plurality of containerized data processing components, wherein the plurality of containerized data processing components process the plurality of data sets, wherein the processing stage performs one or more of data encryption, data reduction, and data indexing prior to a data set is transmitted to the target site;
transmit the plurality of data sets from the plurality of containerized data processing components to the target site;
wherein, for each data ingest component of the plurality of data ingest components, a respective pipeline is formed through the staging cluster and the processing cluster, and wherein the staging cluster and the processing cluster are scalable such that the processor is further configured to:
add an additional pipeline comprising a given containerized broker component in the staging cluster and a given containerized data processing component in the processing cluster when a data ingest component is added;
remove an existing pipeline comprising a given containerized broker component in the staging cluster and a given containerized data processing component in the processing cluster when an existing data ingest component is removed;
receive the transmitted plurality of data sets at a staging cluster comprising a plurality of containerized broker components located at the target site, wherein the plurality of containerized broker components queue the plurality of data sets;
provide the queued plurality of data sets from the plurality of containerized broker components to a processing cluster comprising a plurality of containerized data processing components; and
provide the plurality of processed data sets from the plurality of containerized data processing components to a plurality of data application components;
wherein, for each data set received, a respective pipeline is formed through the staging cluster and the processing cluster, and wherein the staging cluster and the processing cluster are scalable to add or remove a pipeline depending on the number of data sets received;
wherein the source site and the target site are operatively coupled via a communication network.

17. The system of claim 16, wherein each data ingest component receives a data moving task associated with a received data set.

18. The system of claim 16, wherein each of the data application components is executed in its own container.

19. An article of manufacture for moving data from a source site to a target site in a cloud computing platform, the article of manufacture comprising a non-transitory processor-readable storage medium having encoded therein executable code of one or more software programs, wherein the one or more software programs when executed by at least one processing device implement the steps of:
receiving a plurality of data sets to be moved from the source site to the target site at a plurality of containerized data ingest components located at the source site;
providing the received plurality of data sets from the plurality of data ingest components to a staging cluster comprising a plurality of containerized broker components located at the source site, wherein the plurality of containerized broker components queue the plurality of data sets, wherein the staging cluster replicates one or more partitions of the received data set between broker components, and wherein each broker component performs a data deduplication operation;
providing the queued plurality of data sets from the plurality of containerized broker components to a processing cluster comprising a plurality of containerized data processing components, wherein the plurality of containerized data processing components process the plurality of data sets, wherein the processing stage performs one or more of data encryption, data reduction, and data indexing prior to a data set is transmitted to the target site;
transmitting the plurality of data sets from the plurality of containerized data processing components to the target site;
wherein, for each data ingest component of the plurality of data ingest components, a respective pipeline is formed through the staging cluster and the processing cluster, and wherein the staging cluster and the processing cluster are scalable such that the implemented steps further comprise:
  adding an additional pipeline comprising a given containerized broker component in the staging cluster and a given containerized data processing component in the processing cluster when a data ingest component is added;
  removing an existing pipeline comprising a given containerized broker component in the staging cluster and a given containerized data processing component in the processing cluster when an existing data ingest component is removed;
receiving the transmitted plurality of data sets at a staging cluster comprising a plurality of containerized broker components located at the target site, wherein the plurality of containerized broker components queue the plurality of data sets;

providing the queued plurality of data sets from the plurality of containerized broker components to a processing cluster comprising a plurality of containerized data processing components; and providing the plurality of processed data sets from the plurality of containerized data processing components to a plurality of data application components;

wherein, for each data set received, a respective pipeline is formed through the staging cluster and the processing cluster, and wherein the staging cluster and the processing cluster are scalable to add or remove a pipeline depending on the number of data sets received;

wherein the source site and the target site operatively coupled via a communication network.

20. The article of manufacture of claim 19, wherein each of the data application components is executed in its own container.

* * * * *